United States Patent
Coffin et al.

(10) Patent No.: US 6,495,088 B1
(45) Date of Patent: Dec. 17, 2002

(54) METHOD OF MANUFACTURING REIN INFUSED CORE STRUCTURE

(75) Inventors: Paul A. Coffin, Germantown, MD (US); Vincent J. Castelli, Severna Park, MD (US); Deborah Houghton, Annapolis, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 572 days.

(21) Appl. No.: 09/083,247

(22) Filed: May 21, 1998

Related U.S. Application Data

(63) Continuation-in-part of application No. 08/965,132, filed on Nov. 6, 1997.

(51) Int. Cl.[7] .......................... B29C 70/26; B29C 70/44
(52) U.S. Cl. .................. 264/510; 264/102; 264/511; 264/248
(58) Field of Search ................ 264/510, 102, 264/511, 248

(56) References Cited

U.S. PATENT DOCUMENTS

| | | | | |
|---|---|---|---|---|
| 3,661,620 A | * | 5/1972 | Dekking et al. | 117/62.2 |
| 3,978,176 A | * | 8/1976 | Voegeli | 261/122 |
| 4,132,755 A | * | 1/1979 | Johnson | 264/553 |
| 4,681,718 A | * | 7/1987 | Oldham | 264/102 |
| 4,695,343 A | * | 9/1987 | Wycech | 156/196 |
| 4,902,215 A | | 2/1990 | Seemann, III | |
| 4,942,013 A | * | 7/1990 | Palmer et al. | 264/510 |
| 5,356,958 A | * | 10/1994 | Matthews | 523/219 |
| 5,665,461 A | * | 9/1997 | Wong et al. | 523/218 |
| 5,773,121 A | * | 6/1998 | Meteer et al. | 428/117 |

* cited by examiner

Primary Examiner—Stefan Stakovici
(74) Attorney, Agent, or Firm—Jacob Shuster

(57) ABSTRACT

A layered arrangement is fabricated by deposit on a mold surface to form a porous foam core of coated microballoons which is assembled within a sandwich between layers of fibrous skin. The sandwich supported on the mold surface is then is sealed within a film enclosure through which a one-shot infusion of liquid resin is performed. After curing and hardening of the infused resin, the film enclosure is removed from the sandwich to expose a multilayered structure.

1 Claim, 3 Drawing Sheets

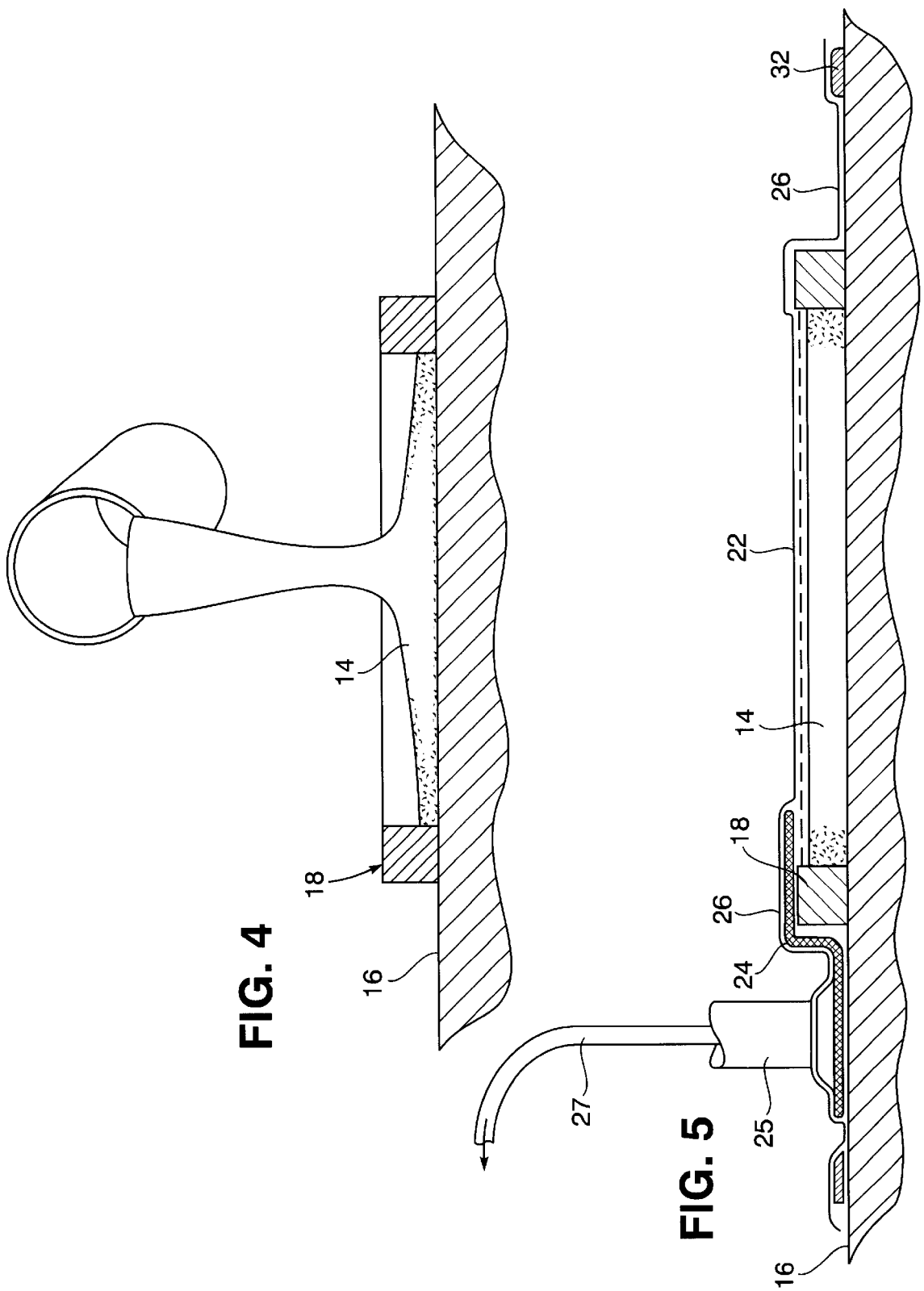

METHOD OF MANUFACTURING REIN INFUSED CORE STRUCTURE

The present invention relates in general to the fabrication of panel structures, and is a continuation-in-part of prior copending application Ser. No. 08/965,132, filed Nov. 6, 1997, the disclosure of which is incorporated herein.

BACKGROUND OF THE INVENTION

The fabrication of composite structures from fiber reinforcement layers utilizing a resin infusion and curing technique in connection therewith is already known in the art. The use of such a process for fabrication of structures having multilayer cores sandwiched between fiber-reinforced skins, is usually labor intensive for a variety reasons, most notably due to adhesive bonding and plural infusion operations.

SUMMARY OF THE INVENTION

In accordance with the present invention, a porous core is fabricated by compacting and heating a thermoplastic coated microballoon type of material. Layers of such cores are then assembled with layers of reinforcing material, such as fiberglass cloth to form a dry multi-layer sandwich layup. The layup is then bonded by reacting while receiving resin by infusion through the porous cores.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein:

FIGS. 4, 5 and 6 are partial section views illustrating assemblage and stages of the process for fabricating a single panel portion of the product shown in FIG. 1.

DETAILED DESCRIPTION OF PREFERRED EMBODIMENT

Figure 1:
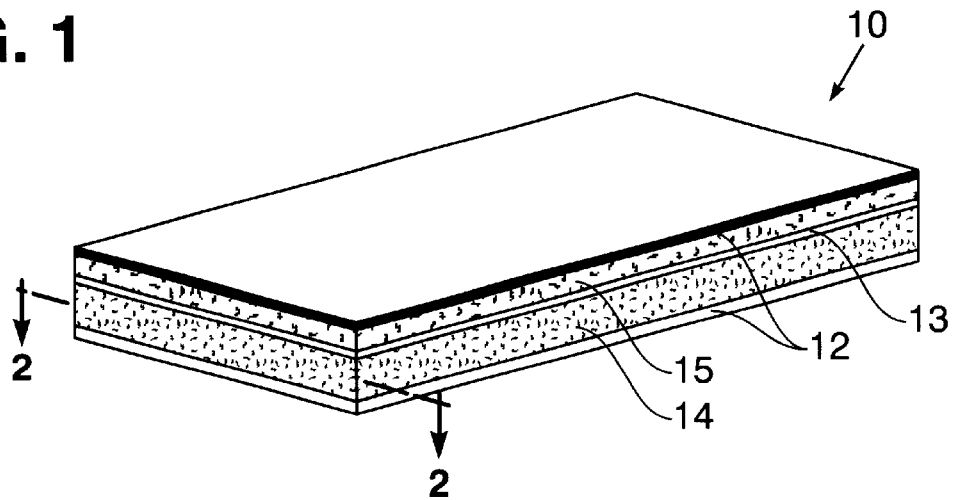
FIG. 1 is a perspective view of a typical multi-layered panel product fabricated in accordance with the present invention.
Figure 2:
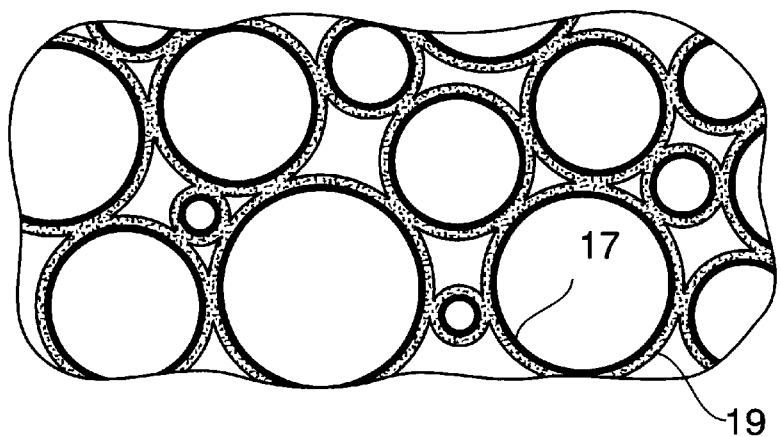
FIG. 2 is a partial section view taken substantially through a plane indicated by section line 2—2 in FIG. 1.

Referring now to the drawing in detail, FIG. 1 illustrates a multi-layered structural product to be fabricated in accordance with the present invention, such as a five layer sandwich panel structure 10 consisting of two outer fibrous reinforcement skins 12 between which two porous syntactic foam cores 14 and 15 are disposed having a third skin 13 sandwiched therebetween. Selected materials and coatings are used to form the foam cores 14 and 15 in order to endow the panel product 10 with desired properties. As shown in FIG. 2, each of the foam cores 14 and 15 embodies microballoons 17 of different diameters (nominally 60 microns). The microballoons 17 are made of materials such as glass, carbon, silica, flyash, phenolics and ceramics. Thermoplastic coatings 19 of 1 micron thickness, for example, surround adjacent microballoons 17 and are welded to each other as shown. Each of the skins 12 and 13 in contact with the cores 14 and 15 is formed from a high strength fibrous material such as fiberglass fabric.

Figure 3:
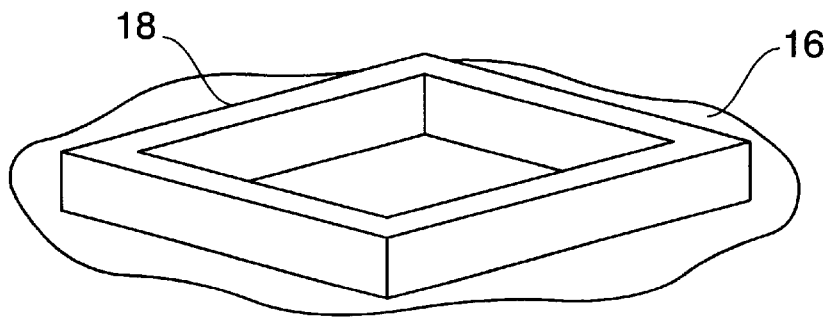
FIG. 3 is a perspective view of an environment utilized to fabricate the product shown in FIG. 1.

As shown in FIG. 3, the fabrication process is to be performed on a flat level mold surface 16 onto which a rectangular dam 18 is placed to frame an area on the mold surface slightly larger than that of the final size of the panel product 10. The dam 18 may be made of a cross-sectionally square steel rod having a height or thickness slightly greater than that of the panel to be formed therein. The rectangular area on the mold surface 16 framed by the dam 18 is treated with a mold release coating to allow removal of the product panel therefrom upon completion of the fabrication process.

Figure 6:
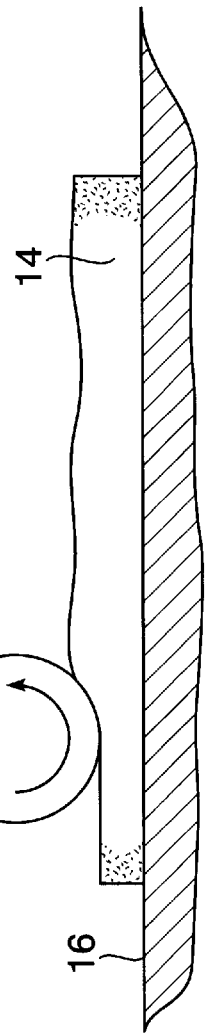

FIGS. 4, 5 and 6 illustrate formation of a single core panel assembled on the coated mold surface area framed within the dam 18. A sufficient quantity of a powder-like mass of material forming the foam core 14, is poured onto the mold surface 16 as shown in FIG. 4. Such mass of material formed from the microballoon solids 17 having the coatings 19 thereon is then spread to a uniform thickness by means of a screed.

FIG. 5 shows the foam core 14 on the mold surface 16 framed by the dam 18, with a non-adhesive porous peel ply 22 placed thereover to prevent its adhesion to a vacuum bag 26. Also, a peripheral portion of the assembly framed within the dam 18 is covered by a ply of breather cloth 24 which extends therefrom over one side of the darn 18 onto the mold surface 16 to apply vacuum from a port 25 to the core 14. The vacuum bag 26 is placed over the assembly within the dam 18 overlying ply 22 and breather cloth 24 while sealed to the mold surface 16 on all sides of the dam 18 by a strip of vacuum sealant tape 32. The vacuum bag 26 forms a film envelope made of an impermeable nylon material covering the entire lay-up arrangement as shown in FIGS. 5 so as to subject such lay-up arrangement to a vacuum pressure from a pump through the vacuum port 25 and tubing 27 connected to the pump. While the vacuum is applied to the lay-up to consolidate the microballoons 17 therein, the lay-up is heated to the heat seal temperature of the coatings 19 on the microballoon 17 so as to weld them to each other at contact points therebetween as shown in FIG. 2. The panel assembly is then cooled down before removal of the bag 26 and breather cloth 24 so that it may be machined to the desired thickness by a planer 31 for example as shown in FIG. 6 in order to complete formation of the porous core 14.

Figure 7:
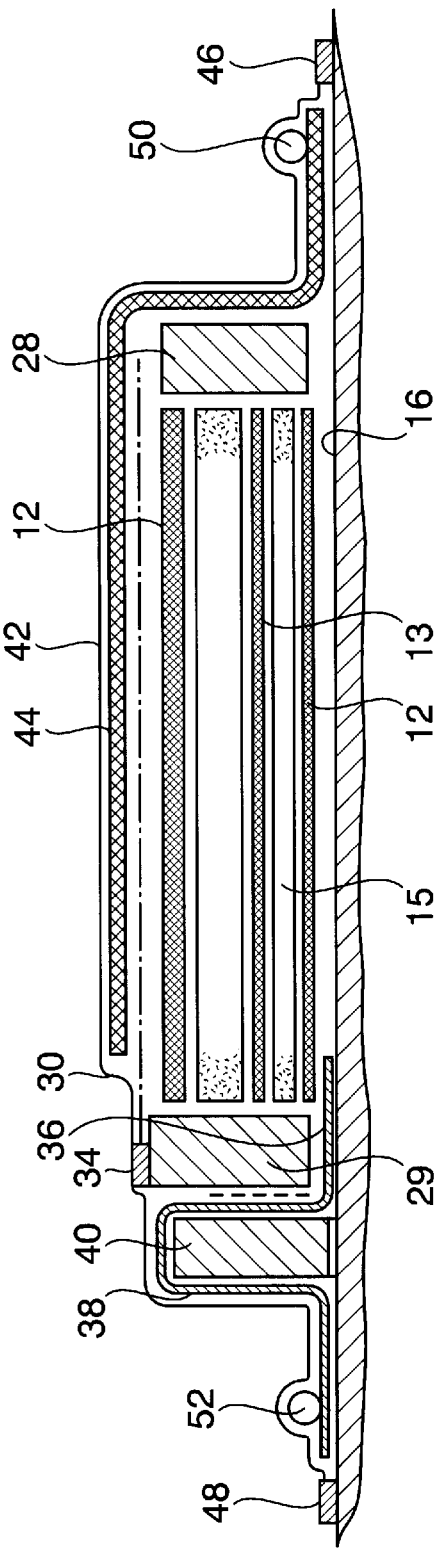
FIG. 7 is a partial section view illustrating assemblage and final resin infusion stage of the process for fabricating the multi-layered panel product shown in FIG. 1.

Formation of each panel core portion 14 and 15 of the five layer product 10, hereinbefore described with respect to FIGS. 3, 4, 5 and 6, is applicable to the process of forming the entire sandwich panel product 10 by an assembled arrangement on the mold surface 16 as shown in FIG. 7, wherein an inner dam 28 surrounds the lay-up of two porous syntactic foam cores 14 and 15 separated by the intermediate glass cloth reinforcement ply 13 and the outer plys 12. A porous peel ply release cloth 30 overlies the lay-up within the inner dam 28. At one (left) side of the panel as shown in FIG. 7, which is adjacent to the vacuum port 25, a peel ply release cloth 36 also peripherally underlies the lay-up on top of an underlying portion of resin distribution ply 38 extending under dam 29 and over an adjacent outer dam 40 on one side of dam 29. A vacuum bag 42 covers the ply 38 as well as a resin distribution ply 44 overlying the ply 30 and its underlying panel lay-up. Such vacuum bag 42 is secured to the dam 29 by sealing tape 34 and to the mold surface 16 by sealing tapes 46 and 48 to thereby enclose a resin inlet 50 adjacent to tape 46 and a vacuum port 52 adjacent to tape 48, as shown in FIG. 7.

By means of the foregoing described arrangement illustrated in FIG. 7, a one-shot infusion of resin into the multi-panel lay-up is achieved during a single infusion operation. Initially, such infusion operation is initiated by application of a vacuum through port 52, while the resin inlet 50 is clamped off to block inflow from a source of catalyzed liquid resin such as vinylester. The inlet tube 50 is then unclamped to allow a forced one-shot inflow of the resin into the lay-up. Once the resin is fully infused and has harden to its cured state, the vacuum bag 42 is removed and the multilayered sandwich panel product 10 is removed from the mold surface 16 for final trimming.

Obviously, other modifications and variations of the present invention may be possible in light of the foregoing teachings. It is therefore to be understood that within the scope of the appended claims the invention may be practiced otherwise than as specifically described.

What is claimed is:

1. A method of fabricating a structure having predetermined properties following infusion of resin into and curing within said structure, including the steps of: assembling a porous core having coatings thereon; sealingly enclosing said assembled core within an envelope to induce said infusion therethrough of the resin under pressure and said curing in one operation; heating the assembled core to weld said coatings to each other; and removing the envelope following said curing of the resin within the core to expose the structure.

* * * * *